US011102532B2

(12) United States Patent
Cohen

(10) Patent No.: US 11,102,532 B2
(45) Date of Patent: *Aug. 24, 2021

(54) HIGH DEFINITION TELEVISION SIGNAL COMPATIBILITY VERIFICATION

(71) Applicant: TIVO CORPORATION, San Jose, CA (US)

(72) Inventor: Andrew D. Cohen, Plymouth Meeting, PA (US)

(73) Assignee: TiVo Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/905,290

(22) Filed: Jun. 18, 2020

(65) Prior Publication Data

US 2020/0366951 A1   Nov. 19, 2020

Related U.S. Application Data

(63) Continuation of application No. 14/447,979, filed on Jul. 31, 2014, now Pat. No. 10,728,598, which is a
(Continued)

(51) Int. Cl.
*H04N 7/173* (2011.01)
*H04N 21/258* (2011.01)
(Continued)

(52) U.S. Cl.
CPC ... *H04N 21/25825* (2013.01); *H04N 7/17309* (2013.01); *H04N 21/4104* (2013.01);
(Continued)

(58) Field of Classification Search
CPC ......... H04N 21/25825; H04N 21/4104; H04N 21/441; H04N 21/4516; H04N 21/6582; H04N 7/17309
(Continued)

(56) References Cited

U.S. PATENT DOCUMENTS 6,005,486 A   12/1999 Fridley et al.
6,111,603 A   8/2000 Zhang et al.
(Continued)

FOREIGN PATENT DOCUMENTS

EP   1259072 A1 * 11/2002   ........... H04N 9/7925
WO   0023869 A1   4/2000

OTHER PUBLICATIONS

Vesa, FAQ's, Sep. 18, 2001, <http://www.vesa.org/faqs.htm>.
Digital Visual Interface (DVI), InFocus Proxima, Nov. 2001, pp. 1-10.

*Primary Examiner* — Jefferey F Harold
*Assistant Examiner* — Sahar Aqil Riaz
(74) *Attorney, Agent, or Firm* — Haley Guiliano LLP

(57) ABSTRACT

A system for providing television (TV) service including high definition television (HDTV) service, and for providing verification that a subscriber has connected an HDTV to the system includes a TV service provider headend and a set top box (STB). The HDTV may have an HDTV digital video interface (DVI) interconnect. The STB may be electrically coupled to the headend and have an STB DVI interconnect. When the HDTV DVI interconnect is initially electrically coupled to the STB DVI interconnect, the HDTV generally presents a data signal to the STB and the STB generally presents the data signal to the headend.

24 Claims, 2 Drawing Sheets

Related U.S. Application Data continuation of application No. 13/307,277, filed on Nov. 30, 2011, now Pat. No. 8,832,765, which is a continuation of application No. 10/761,108, filed on Jan. 19, 2004, now Pat. No. 8,087,058.

(51) Int. Cl.
  *H04N 21/658* (2011.01)
  *H04N 21/41* (2011.01)
  *H04N 21/441* (2011.01)
  *H04N 21/45* (2011.01)

(52) U.S. Cl.
  CPC ....... *H04N 21/441* (2013.01); *H04N 21/4516* (2013.01); *H04N 21/6582* (2013.01)

(58) Field of Classification Search
  USPC .................. 725/116, 68, 70, 82, 85, 131
  See application file for complete search history.

(56) References Cited

U.S. PATENT DOCUMENTS

| | | |
|---|---|---|
| 6,169,570 B1 | 1/2001 | Suzuki |
| 6,516,467 B1 | 2/2003 | Schindler et al. |
| 6,633,325 B1 | 10/2003 | Lee |
| 6,661,855 B2 | 12/2003 | Kim |
| 7,009,660 B2 | 3/2006 | Kim |
| 7,224,726 B2 | 5/2007 | Perlow et al. |
| 7,440,520 B2 | 10/2008 | Perlow et al. |
| 7,457,967 B2 | 11/2008 | Cocchi et al. |
| 7,460,546 B2 | 12/2008 | Anderson, IV |
| 8,505,063 B2 | 8/2013 | Coufal et al. |
| 8,832,765 B2 | 9/2014 | Cohen |
| 9,832,501 B2 | 11/2017 | Ruffini et al. |
| 2002/0042914 A1* | 4/2002 | Walker ............... H04N 21/4314 725/36 |
| 2002/0059642 A1 | 5/2002 | Russ et al. |
| 2002/0144265 A1 | 10/2002 | Connelly |
| 2002/0152117 A1 | 10/2002 | Cristofalo et al. |
| 2002/0184643 A1 | 12/2002 | Fichet |
| 2002/0186320 A1 | 12/2002 | Carlsgaard et al. |
| 2003/0071799 A1 | 4/2003 | Myers |
| 2003/0083951 A1 | 5/2003 | Connelly |
| 2003/0117960 A1 | 6/2003 | Quinlan et al. |
| 2003/0126623 A1 | 7/2003 | Hara et al. |
| 2003/0147013 A1 | 8/2003 | Martin |
| 2004/0031053 A1 | 2/2004 | Lim et al. |
| 2004/0133701 A1* | 7/2004 | Karaoguz ............... H04N 7/163 709/246 |
| 2005/0120384 A1* | 6/2005 | Stone ................. G06F 8/60 725/132 |
| 2005/0138654 A1 | 6/2005 | Minne |
| 2005/0198568 A1 | 9/2005 | Matsuzaki |

* cited by examiner

HIGH DEFINITION TELEVISION SIGNAL COMPATIBILITY VERIFICATION

CROSS-REFERENCE TO RELATED APPLICATIONS

This application is a continuation of U.S. patent application Ser. No. 14/447,979, filed Jul. 31, 2014, which is a continuation of U.S. patent application Ser. No. 13/307,277, filed Nov. 30, 2011 (issued as U.S. Pat. No. 8,832,765), which is a continuation of U.S. patent application Ser. No. 10/761,108, filed Jan. 19, 2004 (issued as U.S. Pat. No. 8,087,058), the subject matter of each of which is expressly incorporated by reference herein.

BACKGROUND OF THE INVENTION

1. Field of the Invention

The present invention relates to a system and a method for high definition television (HDTV) subscriber verification.

2. Background Art

High definition television (HDTV) is available from cable (and satellite) television (TV) service providers to the majority of homes, shops, taverns, businesses, etc. (i.e., cable television subscribers or clients) served by the television providers. The HDTV signal is transmitted (i.e., sent, presented, provided, broadcast, etc.) including one or more encoded video signals and typically in at least one of two video formats (e.g., format variations with 720 active lines and 1080 active lines per frame). The 60 Hz and 59.94 Hz variations for the 1080-line format are encoded as interlaced scanned images while the other formats are encoded as progressively scanned images. HDTV signals provide the subscriber with delivery of digitally clean pictures with quality approaching that of 35-mm movies accompanied by CD quality Surround-Sound. The pictures are presented in a panoramic horizontal-to-vertical aspect ratio of 16:9 as in the movies on HDTV receivers. An HDTV receiver can receive, decode and display both formats.

A number of cable and satellite TV subscribers would like to receive and display HDTV signals. These subscribers are provided a set top box (STB) capable of decoding the HDTV formats when they notify the TV service provider that they have an HDTV. To reduce STB inventory and to reduce or eliminate the need to make multiple trips to the subscriber for the installation of STBs, the provider may wish to use a single STB that has analog TV, standard digital television (SDTV) and HDTV capabilities for all subscribers. The provider desires to know how many subscribers hook up (i.e., connect, couple, etc.) the STB to an HDTV receiver so that the TV service can match the TV receiver, however, subscribers may fail to notify the provider that the TV connected to the STB is an HDTV or when an HDTV is no longer hooked up to the STB. Thus, there exists a need for an improved system and method for high definition television (HDTV) subscriber verification.

SUMMARY OF THE INVENTION

To reduce set top box (STB) inventory and to reduce or eliminate the need to make multiple trips to subscribers for the installation of STBs, a television service provider (e.g., a cable TV or satellite TV provider) may wish to use a single STB that has analog television (TV), standard digital television (SDTV) and high definition television (HDTV) capabilities for all subscribers. The provider desires to know how many subscribers hook up (i.e., connect, couple, etc.) the STB to an HDTV receiver as opposed to using the STB in SDTV mode or an analog mode of operation. As subscribers change the television(s) connected to the STB (e.g., upgrade from an analog TV or a SDTV to an HDTV, change back to an analog TV, etc.), the provider TV service should match the new HDTV. However, subscribers may fail to notify the provider that the TV connected to the STB is an HDTV. Advertisers or other service providers may also wish to target programming to HDTV customers based on the customer use of HDTV service and based on the particular HDTV that is used. A system and method for the provider to determine when subscribers have connected an STB to an HDTV, how many HDTVs are coupled to an STB, and the make and model of the HDTVs (i.e., subscriber verification) would be desirable.

The present invention generally provides new and innovative systems and techniques for high definition television (HDTV) subscriber verification by a television service (generally cable or satellite) provider. The present invention generally provides a system and a method for the provider to determine (i.e., count) when subscribers have connected an STB to an HDTV, how many HDTVs are coupled to an STB, and the manufacturer (or make) and model of the HDTVs that are coupled to a headend in a television service distribution system.

According to the present invention, a system for providing television (TV) service including high definition television (HDTV) service, and for providing verification that a subscriber has connected an HDTV to the system is provided. The HDTV may have an HDTV digital video interface (DVI) interconnect. The system comprises a TV service provider headend and a set top box (STB). The STB has a digital video interface (DVI) interconnect. The STB is electrically coupled to the headend. The HDTV has a DVI interconnect. When the HDTV is initially electrically coupled to the STB, the HDTV DVI interconnect presents a data signal to the STB DVI interconnect, and the STB presents the data signal to the headend.

Also according to the present invention, a method for providing television (TV) service including high definition television (HDTV) service, and for providing verification that a subscriber has connected an HDTV is provided. The method comprises providing a TV service provider headend and electrically coupling a set top box (STB) to the headend. The STB has an STB digital video interface (DVI) interconnect, and the HDTV has an HDTV DVI interconnect. When the HDTV DVI interconnect is initially electrically coupled to the STB DVI interconnect, the HDTV presents a data signal to the STB, and the method further comprises receiving the data signal from the STB at the headend.

Further, according to the present invention, for use in a system for television service including high definition television (HDTV) service, a set top box (STB) for verification that a subscriber has connected an HDTV to the STB is provided. The HDTV has an HDTV digital video interface (DVI) interconnect. The STB comprises an STB DVI interconnect. The STB is electrically coupled to a headend. When the HDTV DVI interconnect is initially electrically coupled to the STB DVI interconnect, the HDTV presents a data signal to the STB, and the headend receives the data signal from the STB.

The above features, and other features and advantages of the present invention are readily apparent from the following detailed descriptions thereof when taken in connection with the accompanying drawings.

DETAILED DESCRIPTION OF THE PREFERRED EMBODIMENT(S)

With reference to the Figures, the preferred embodiments of the present invention will now be described in detail. In one example, the present invention may be implemented in connection with a cable television transmission and reception system. In another example, the present invention may be implemented in connection with a satellite (i.e., "dish") broadcast television transmission and reception system (not shown). However, the present invention may be implemented in connection with any appropriate television transmission and reception system to meet the design criteria of a particular application.

The present invention may monitor installation and removal of particular types of viewing devices in the television transmission and reception system. In particular, the present invention generally provides a system and a method for the provider to determine (i.e., count) when subscribers have connected an STB to an HDTV, how many HDTVs are coupled to an STB, and the manufacturer (or make) and model of the HDTVs that are coupled to a headend in a television service distribution system.

Figure 1:
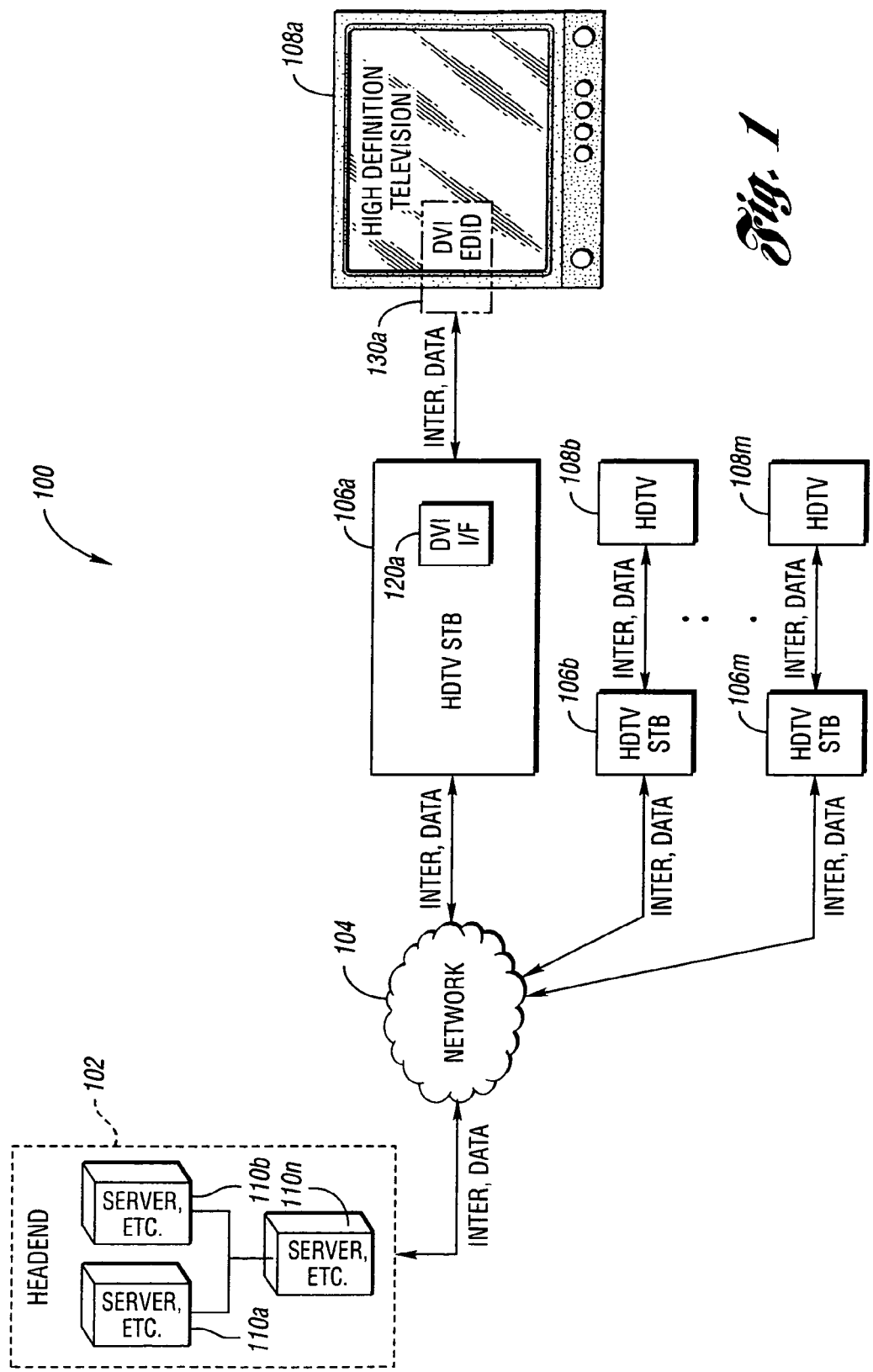
FIG. 1 is a diagram of the present invention implemented in connection with a cable television system.

Referring to FIG. 1, a diagram illustrating a television distribution system 100 of the present invention is shown. The system 100 generally comprises a headend 102, a network 104, at least one set top box (STB) 106 (generally a plurality of STBs 106a-106m), and at least one respective viewing device 108 (generally a plurality of viewing devices 108a-108m). The system 100 is generally implemented as a television service provider/subscriber system wherein the provider generally operates the headend 102 and the network 104, and also provides a subscriber (i.e., client, customer, service purchaser, user, etc.) with the STB 106. The STB 106 is generally located at the subscriber location (not shown, e.g., home, tavern, hotel room, business, etc.) and the viewing device 108 is generally provided by the client. The viewing device 108 is generally implemented as a high definition television (HDTV).

The headend 102 is generally electrically coupled to the network 104, the network 104 is generally electrically coupled to the STB 106, and the STB 106 is generally electrically coupled to the respective HDTV 108. The electrical coupling may be implemented as any appropriate hard-wired (e.g., twisted pair, untwisted conductors, coaxial cable, fiber optic cable, hybrid fiber cable, etc.) or wireless (e.g., radio frequency, microwave, infrared, etc.) coupling and protocol (e.g., HomePlug, HomePNA, IEEE 802.11(a-b), Bluetooth, HomeRF, etc.) to meet the design criteria of a particular application. While the system 100 is illustrated showing one STB 106 coupled to a respective one viewing device 108, the STB 106 may be implemented having the capability of coupling more than one viewing device 108 (not shown).

The headend 102 generally comprises a plurality of devices 110 (e.g., devices 110a-110n) that are implemented as data servers, computers, processors, and the like configured to provide video and audio data (e.g., movies, music, television programming, and the like), processing equipment (e.g., provider operated subscriber account processing servers), television service transceivers (e.g., transceivers for standard broadcast television and radio, digital television, HDTV, audio, MP3, text messaging, gaming, etc.), and the like. In one example, the headend 102 may generate and present (i.e., transmit, provide, pass, broadcast, send, etc.) a signal (e.g., INTER) as well as conventional television service provider signals (not shown). The signal INTER may be implemented as a control signal. The signal INTER may trigger an interrogation (i.e., polling, enumeration, etc.) process of the HDTV 108.

The headend 102 may receive a signal (e.g., DATA). The signal DATA may be implemented as a data signal that contains information about the HDTV 108. The information contained in the signal DATA is generally data regarding the configuration of a particular HDTV 108 (e.g., manufacturer and model, display capability parameters, etc.). The signal DATA is generally implemented as an extended display identification data (EDID) signal (an example of which is provided below as TABLE 1).

The network 104 is generally implemented as a television signal distribution network that is configured to selectively distribute (i.e., transmit and receive) conventional television service provider signals (e.g., standard broadcast television and radio, digital television, HDTV, audio, MP3, text messaging, etc.), the signal INTER, and the signal DATA to and from the STBs 106 and the viewing devices 108. The signals are generally distributed based upon (or in response to) subscriber information. For example, the level of service the client has purchased (e.g., basic service, premium movie channels, etc.), the type of service the client has requested (e.g., standard TV, HDTV, interactive messaging, etc.), and the like may determine the signals that are sent to a particular subscriber.

The STB 106 is generally implemented as an STB having HDTV signal capability as a stand-alone feature or implemented in connection with additional signal distribution capability (e.g., standard broadcast television and radio, digital television, audio, MP3, text messaging, etc.). The STB 106 generally comprises at least one interface (I/F) (e.g., interconnect, port, etc.) 120. The interface 120 may be implemented as a digital video interface (DVI). When a plurality of HDTVs 108 are coupled to a particular STB 106 (not shown), an STB interface 120 may be implemented for each respective HDTV 108 that is coupled to the particular STB 106. The STB DVI 120 is generally configured to present and receive the conventional television service provider signals, the signal INTER, and the signal DATA to and from the HDTV 108. In another example, the STB 106 may generate the signal INTER.

The HDTV 108 generally comprises an interface (e.g., interconnect, port, etc.) 130. The HDTV interface 130 may be implemented as a DVI interface that is coupled to the respective interface 120 of the STB 106. The HDTV DVI 130 may be configured to provide extended display identification data (EDID) that is related to the particular, respective HDTV 108 as the signal DATA. An example of typical EDID (e.g., an example of the content of the signal DATA) is shown as follows in TABLE 1.

TABLE 1

| EDID Version # 1, Revision # 3 |
| --- |

| 128 BYTES OF EDID CODE: |
| --- |

|    | 0  | 1  | 2  | 3  | 4  | 5  | 6  | 7  | 8  | 9  | A  | B  | C  | D  | E  | F  |
| -- | -- | -- | -- | -- | -- | -- | -- | -- | -- | -- | -- | -- | -- | -- | -- | -- |
| 0  | 00 | FF | FF | FF | FF | FF | FF | 00 | 41 | 2F | 0B | 00 | 01 | 01 | 01 | 01 |
| 10 | 00 | 0B | 01 | 03 | 80 | 6D | 3E | 78 | 2A | 1B | BE | A2 | 55 | 34 | B3 | 26 |
| 20 | 14 | 4A | 52 | BF | EE | 80 | 81 | 80 | 81 | 40 | 71 | 4F | 31 | 59 | 45 | 59 |
| 30 | 61 | 59 | 01 | 01 | 01 | 01 | 64 | 19 | 00 | 40 | 41 | 00 | 26 | 30 | 18 | 88 |
| 40 | 36 | 00 | 66 | 6C | 32 | 00 | 00 | 18 | A4 | 1F | 00 | 98 | 51 | 00 | 22 | 30 |
| 50 | 30 | 70 | 13 | 00 | 4A | 6C | 42 | 00 | 00 | 1A | 00 | 00 | 00 | FD | 00 | 37 |
| 60 | 3D | 18 | 41 | 0A | 00 | 0A | 20 | 20 | 20 | 20 | 20 | 20 | 00 | 00 | 00 | FC |
| 70 | 00 | 50 | 44 | 41 | 2D | 35 | 30 | 30 | 32 | 0A | 20 | 20 | 20 | 20 | 00 | 93 |

(08H-09H) ID Manufacturer Name _____ = PIO
(0AH-0BH) Product ID Code _____ = 0B00
(0CH-0FH) Last 5 Digits of Serial Number _____ = 01537
(10H) Week of Manufacture _____ = 00
(11H) Year of Manufacture _____ = 2001
(0AH-11H) Complete Serial Number _____ = 10001537
(12H) EDID Version Number _____ = 1
(13H) EDID Revision Number _____ = 3
(14H) VIDEO INPUT DEFINITION:
Digital Signal
(15H) Maximum Horizontal Image Size _____ = 1090 cm
(16H) Maximum Vertical Image Size _____ = 620 cm
(17H) Display Gamma _____ = 2.20
(18H) DPMS and Supported Feature(s):
Active Off, Preferred Timing Mode
Display Type = R/G/B Color
(19H-22H) CHROMA INFO:
Red X—0.633 Green X—0.205 Blue X—0.150 White X—0.292
Red Y—0.333 Green Y—0.702 Blue Y—0.081 White Y—0.322
(23H) ESTABLISHED TIMING I:
720 × 400 @ 70 Hz (IBM, VGA)
640 × 480 @ 60 Hz (IBM, VGA)
640 × 480 @ 67 Hz (Apple, Mac II)
640 × 480 @ 72 Hz (VESA)
640 × 480 @ 75 Hz (VESA)
800 × 600 @ 56 Hz (VESA)
800 × 600 @ 60 Hz (VESA)
(24H) ESTABLISHED TIMING II:
800 × 600 @ 72 Hz (VESA)
800 × 600 @ 75 Hz (VESA)
832 × 624 @ 75 Hz (Apple, Mac II)
1024 × 768 @ 60 Hz (VESA)
1024 × 768 @ 70 Hz (VESA)
1024 × 768 @ 75 Hz (VESA)
(25H) Manufacturer's Reserved Timing:
1152 × 870 @ 75 Hz (Apple, Mac II)
(38-53) Standard Timing Identification:
Standard Timing ID 1: 1280 × 1024 @ 60 Hz
Standard Timing ID 2: 1280 × 960 @ 60 Hz
Standard Timing ID 3: 1152 × 864 @ 75 Hz
Standard Timing ID 4: 640 × 480 @ 85 Hz
Standard Timing ID 5: 800 × 600 @ 85 Hz
Standard Timing ID 6: 1024 × 768 @ 85 Hz
Standard Timing ID 7—Not Used
Standard Timing ID 8—Not Used
(36H-47H) Detailed Timing/Descriptor Block 1:
1024 × 768 Pixel Clock: 65.00 MHz
Horizontal Image Size: 870 mm          Vertical Image Size: 620 mm
Refreshed Mode: Non-Interlaced          Normal Display—No Stereo
Horizontal:
Active Time: 1024 pixels          Blanking Time: 320 pixels
Sync Offset: 24 pixels          Sync Pulse Width: 136 pixels
Border: 0 pixels          Frequency: 48.36 KHz
Vertical:
Active Time: 768 lines          Blanking Time: 38 lines
Sync Offset: 3 lines          Sync Pulse Width: 6 lines
Border: 0 lines          Frequency: 60.00 Hz
Digital Separate, Horizontal Polarity (−) Vertical Polarity (−)
(48H-59H) Detailed Timing/Descriptor Block 2:
1280 × 768 Pixel Clock: 81.00 MHz
Horizontal Image Size: 1098 mm          Vertical Image Size: 620 mm
Refreshed Mode: Non-Interlaced          Normal Display—No Stereo
Horizontal:
Active Time: 1280 pixels          Blanking Time: 408 pixels
Sync Offset: 48 pixels          Sync Pulse Width: 112 pixels TABLE 1-continued EDID Version # 1, Revision # 3

Border: 0 pixels
Vertical:
Active Time: 768 lines
Sync Offset: 1 lines
Border: 0 lines
Digital Separate, Horizontal Polarity (+) Vertical Polarity (−)
(5AH-6BH) Detailed Timing/Descriptor Block 3:
Monitor Range Limits:
Min Vertical Freq—55 Hz
Max Vertical Freq—61 Hz
Min Horiz. Freq—24 KHz
Max Horiz. Freq—65 KHz
Pixel Clock—100 MHz
GTF—Not Used
(6CH-7DH) Detailed Timing/Descriptor Block 4:
Monitor Name:
PDA-5002
(7EH) Block No: No Extension EDID Block(s)
Error: (0-3) Incorrect Extension Flag
(7FH) CheckSum OK Frequency: 47.99 KHz Blanking Time: 34 lines
Sync Pulse Width: 3 lines
Frequency: 59.83 Hz In another example, the I/F 120 and the I/F 130 may be implemented as High Definition Multimedia Interface (HDMI) interfaces. However, the I/F 120 and the I/F 130 may be implemented as any appropriate interface to meet the design criteria of a particular application.

Figure 2:
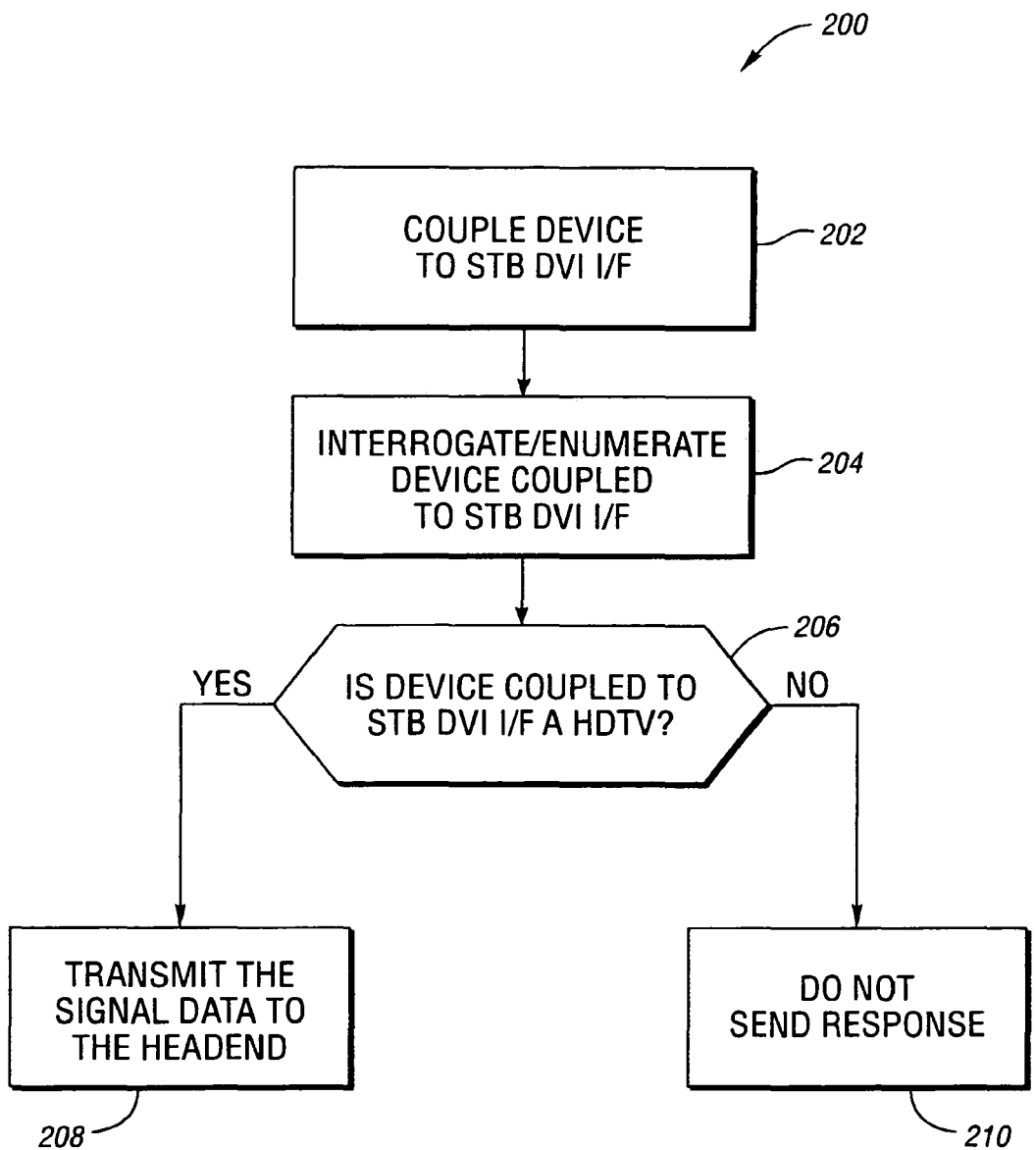
FIG. 2 is a flow diagram of a method of the present invention.

Referring to FIG. 2, a flow diagram illustrating an operation (i.e., method, process, steps, blocks, procedure, routine, etc.) 200 of the present invention is shown. In one mode of operation, the HDTV 108 may present the signal DATA to the STB 106 whenever an interconnection, hook up, or coupling (via wiring, cable, wirelessly, etc.) is initially made between the STB 106 and the HDTV 108 via the electrical coupling of the STB DVI 120 and the HDTV DVI 130 (e.g., blocks or steps 202, 204, and 206), and the HDTV 108 is enumerated by the STB 106 (e.g., the block or step 208). Enumeration is generally implemented as the initial exchange of information between a host (e.g., the STB 106) and a device (e.g., the HDTV 108) such that applications in the host (e.g., HDTV broadcast signals) can communicate with the device.

During enumeration the host is generally provided information about the device by the device (e.g., the EDID information about the HDTV 108 via the signal DATA). The host may assign a device driver. The enumeration process may include any or all of the steps of assigning an address to the device, reading data structures from the device, assigning and loading a device driver, and selecting a configuration from the options presented in the retrieved data. The device may then be configured and ready to receive or transfer data (e.g., the HDTV 108 may receive HDTV signals from the STB 106). The signal DATA is generally presented by the STB 106 to the headend 102 via the network 104.

The enumeration process is generally performed whenever there is a change in state, (i.e. whenever the STB DVI 120 connection from the STB 106 to the HDTV DVI 130 connection on the HDTV 108 is unplugged and plugged back in again, e.g., block or step 202). When a non-HDTV device (e.g., an analog TV, a SDTV, etc.) is connected (or coupled) to the STB 106, the signal DATA is not generated or sent (e.g., the block or step 210).

In another mode of operation, the HDTV 108 may be configured to present the signal DATA when interrogated (or polled) by the headend 102 or by the STB 106. The HDTV 108 may be configured to present the signal DATA in response to the signal INTER. In one example, the signal INTER may be generated and presented when an operator of the headend 102 decides to interrogate the HDTV 108 via a user command (e.g., during a system 100 audit). In another example, the signal INTER may be generated and presented when a customer indicates a change in service (e.g., a loss of signal, a degradation of signal, etc.).

In yet another example, the signal INTER may be generated and presented periodically (e.g., daily, weekly, monthly, etc.). The present invention generally monitors the installation (and removal) of HDTVs (e.g., the viewing devices 108) to and from the system 100 and provides subscriber verification (i.e., determines (i.e., counts) when subscribers have connected an STB 106 to an HDTV 108, how many HDTVs 108 are coupled to an STB 106, and the manufacturer (or make) and model of the HDTVs 108 that are coupled to a headend in a television service distribution system 100).

The STB 106 may be implemented having several connectors (e.g., one or more "component" interface connectors, one or more DVI interface connectors such as the STB DVI 120, etc.) on the unit that enable connection to a TV (e.g., the viewing device 108). At the present time, to view HDTV signals, either the "component" outputs, or the DVI connector can be used. Due to a recent Federal Communication Commission ruling, the STB "component" outputs will not be usable for HDTV signals due to security issues, and therefore the DVI connector 120 must be used to present HDTV signals to a receiver 108.

The DVI connector 120 is "intelligent", in that the DVI connector 120 may interrogate (or poll) the respective TV 108 to determine what kind of media the viewing device 108 can accommodate via the enumeration process or when the signal INTER is presented. The interrogation is generally performed via interrogating the EDID port 130 on the TV 108. The interrogation process can be used by the provider to determine whether an HDTV has been connected, where the STB 106 software interrogates the TV 108, and then passes the information (i.e., the signal DATA) back to the headend 102, generally via the network 104. At the headend 102, the information in the signal DATA is generally counted to determine the number, type and location of HDTVs that are in use at a particular time in the system 100. The information contained in the signal DATA may be used by the provider to optimize the signals that are sent to a particular customer or location. The information contained in the signal DATA may also be used to build demographics that could also be sold to TV program providers, and advertising companies.

As is readily apparent from the foregoing description, then, the present invention generally provides an improved system and an improved method for high definition television (HDTV) subscriber verification.

Glossary

This specification may directly or implicitly use one or more of the terms defined as follows:

AC-3: The 5.1-channel sound system specified in the Standard for Digital-HDTV. Also known as "Dolby Digital," AC-3 generally provides CD-quality digital audio, and five full-bandwidth channels for front left, front right, center, surround left and surround right speakers, plus an LFE (low frequency effect) subwoofer, for a total of 5.1 channels.

Addressable Resolution: The highest resolution signal that a display device (e.g., a TV or a monitor) can accept. Note that although a particular device (e.g., a Digital-HDTV) is able to receive the resolution, it may not be capable of displaying it.

Analog TV: Analog TV is the NTSC Standard for traditional "over the air" television broadcasts generally having amplitude modulated (AM) video signals. Analog signals vary continuously, representing fluctuations in color and brightness.

Artifacts: Unwanted visible effects in the picture caused by disturbances in the transmission or image processing, such as 'edge crawl' or 'hanging dots' in analog pictures, or 'pixelation' in digital pictures.

Aspect Ratio: Generally the width of a picture relative to the picture height. For example, when an NTSC picture is 4 feet wide, the picture will be 3 feet high; thus the picture has a 4:3 aspect ratio. HDTV has a 16:9 aspect ratio.

Blitter (or "raster blaster"): A special purpose integrated circuit or hardware that performs "blit" or "bit bang" operations and is used for rapid implementation of bit-mapped graphics.

Bandwidth: A range of frequencies used to transmit information such as picture (i.e., video) and sound (i.e., audio). For TV broadcasters, the FCC has allocated 6 Mhz for each channel. For DTV, the maximum bit rate possible within the bandwidth is 19.4 Mbps, which is one HDTV channel. SDTV has a lower bit rate, therefore the bandwidth can accommodate more than one channel.

Bit Rate: Measured as "bits per second," and used to express the rate at which data is transmitted or processed. The higher the bit rate, the more data that is processed and, typically, in video applications the higher the picture resolution.

Channel: In television, a 6 Mhz (bandwidth) section of broadcasting spectrum allocated for one analog NTSC transmission.

Component Video Connection: The output of a video device (such as a DTV set-top box), or the input of a DTV receiver or monitor consisting of 3 primary color signals: red, green, and blue that together convey all necessary picture information. With current consumer video products, the 3 component signals have been translated into luminance (Y) and two color difference signals (PP, PR), each on a separate wire.

Composite Video: An analog, encoded video signal (such as NTSC) that includes vertical and horizontal synchronizing information. Since both luminance (brightness) and chrominance (color) signals are encoded together, only a single connection wire is needed (e.g., RCA cables or the like).

Compression: A method of electronically reducing the number of bits required to store or transmit data within a specified time or space. The video industry uses several types of compression methods but the method adopted for DTV is called "MPEG2." Four full-range channels of programming and data can be compressed into the same space required by a single analog channel (e.g., 6 MHz.).

Datamine: Search, copy, extract information from at least one database.

Digital Content Protection LLC: The organization that licenses technologies (e.g., secret device keys) for digital content protection.

Dhrystone: A short, synthetic benchmark program that is intended to be representative of system or of integer programming. The memory outside of cache may not be tested.

Downconvert: The format conversion from a higher resolution input signal number to a lower display number, for example, 1080i input to 480i display.

Enumeration: The initial exchange of information between a host and a device such that applications in the host can communicate with the device. During enumeration the host is provided information about the device and may assign a device driver. The enumeration process can include any of the steps of assigning an address to the device, reading data structures from the device, assigning and loading a device driver, and selecting a configuration from the options presented in the retrieved data. The device may then be configured and ready to transfer data.

Gourand shading: The polygons that comprise the 3-D graphic images that are to be shaded. Gourand shading generally prevents a "chicken-wire" framework depiction and presents a more realistic depiction of landscape and structure graphics than 3-D images using some alternative approaches.

Headend: The control center of a cable television system, where broadcast signals are received and distributed.

High Bandwidth Digital Content Protection (HDCP): HDCP is an Intel specification used to protect digital content transmitted and received by DVI-compliant displays. HDMI supports standard, enhanced, or high-definition video plus standard to multi-channel surround-sound audio.

High Definition Multimedia Interface (HDMI): HDMI is a specification that combines video and audio into a single digital interface. The basis for HDMI is HDCP and the core technology of Digital Visual Interface (DVI).

High Definition Television (HDTV): Generally refers to digital television that is approximately twice the vertical and horizontal picture resolution of today's NTSC TV, which essentially makes the picture twice as sharp. HDTV also has a screen ratio of 16:9 as compared with most analog TV screens, which have a screen ratio of 4:3. HDTV generally provides reduced motion artifacts (i.e. ghosting, dot crawl), and offers 5.1 independent channels of CD-quality stereo surround sound (e.g., AC-3).

Interlaced Scanning: In a television display, interlaced scanning refers to the process of re-assembling a picture from a series of electrical (video) signals. The "standard" NTSC system uses 525 scanning lines to create a picture (frame). The frame/picture is made up of two fields: The first field has 262.5 odd lines (1, 3, 5 . . . ) and the second field has 262.5 even lines (2, 4, 6 . . . ). The odd lines are scanned (or painted on the screen) in 1/60th of a second and the even lines follow in the next 1/60th of a second. This presents an entire frame/picture of 525 lines in 1/30th of a second.

Letterbox: The display of a 16:9 aspect ratio image on a 4:3 screen, wherein black areas are visible above and below the image.

Line Doubling: A method, through special circuitry, to modify an NTSC interlaced picture to generate an effect similar to a progressively scanned picture. The first field of 262.5 odd-numbered lines is stored in digital memory and combined with the even-numbered lines. Then all 525 lines are scanned in 1/30th of a second. The result is improved detail enhancement from an NTSC source.

Middleware: Software that mediates between an application program and a network. Middleware generally manages interactions between disparate applications across heterogeneous computing platforms.

Media furnace: A nickname for an entertainment server. An appliance that generally combines at least one microprocessor, networking capability, at least one graphical user interface, and at least one very high capacity (e.g., greater than 200 GB) hard drive to provide one or more of movie, television, and music (e.g., digital jukebox) digital audio/video record/playback, cable access, satellite dish access, video gaming, and the like.

Ofoto: An on-line photography service that provides prints of digital and film camera images.

Pixel: Term used for "picture element;" the smallest element in a video display (e.g., television) picture. The total number of pixels limits the detail that can be seen on a television or monitor. A typical television set has less than half a million pixels. The pixel count for HDTV is nearly two million.

Progressive Scanning: In progressive scanning, typically used by VGA computer monitors, all the horizontal scan lines are 'painted' on the screen at one time. Adopted DTV formats include both interlaced and progressive broadcast and display methods.

Primitive: Fundamental unit of instruction or coding.

Resolution: The density of lines and dots per line which make up a visual image. Usually, the higher the numbers, the sharper and more detailed the picture will be. In terms of DTV, maximum resolution refers to the number of horizontal scanning lines multiplied by the total number of pixels per line, also referred to as pixel density.

Spectrum: A range of frequencies available for over-the-air transmission.

Thin client: A simple client program and hardware interfaced to at least one server that relies on most of the system functionality residing in the respective server. In contrast, fat clients such as networked personal computers typically provide all functionality except some of the file storage and printing. Thin client configurations may provide an easier maintenance environment since physical access to every user is not required. Thin client configurations are generally implemented with simpler hardware than other (i.e., non-thin) configurations.

Toslink: A type of fiber-optic cable connection that uses beams of light through a clear cable to transmit information.

Trick modes: Modes of video playback, generally referring to DVD players, which in many cases emulate VCR player advanced playback functions. Trick modes generally include but are not limited to Pause, Fast Forward, Fast Reverse, Reverse (or Backward) Play, Rewind, Freeze-Frame, and the like.

Upconvert: The conversion of a lower apparent resolution to a higher number, such as "upconverting" 720p to 1080i. Upconversion is generally is a misnomer, since to accomplish upconversion, the horizontal scanning frequency is actually lowered from 45 kHz to 33.75 kHz. Resolution quality is not improved by the upconversion method described.

Abbreviations and Acronyms

This specification may directly or implicitly use one or more of the following abbreviations and acronyms:

ACL Access Control List
ATSC Advanced Television Systems Committee. The ATSC is the committee responsible for developing and establishing Digital-HDTV Standards as well as all (18 or more) formats of Digital TV.
A/D Analog to digital conversion (or converter). Used at transmission end of broadcast.
ATV Advanced Television" is an earlier term used to describe the development and advance applications of digital television, now simply referred to as DTV.
BPI Baseline Privacy Interface
BTSC Broadcast Television Systems Committee
CA Conditional Access
CableCARD™ Removable/Replaceable security card, previously known as POD
CM Cable Modem
CMM Cable Modem Module
CMTS Cable Modem Termination System
CPE Customer Premises Equipment
CTB Cache Transfer Bus
D/A Conversion of digital to analog signals. The also referred to as DAC (D/A conversion or converter). For conventional television technology to display digitally transmitted TV data, the data must be decoded and then converted back to an analog signal.
DBS Digital Broadcast Satellite. Digital TV transmissions via satellite.
DTV Digital Television. Also referred to as ATV (Advanced TV). See ATV. All formats of digital television, including high definition television (HDTV) and standard definition television (SDTV).
DTS Digital Theater Systems sound. Discrete 5.1 channel surround system similar but not the same as Dolby Digital. Dolby Digital is the DTV standard, but DTS competes with it on DVD and in the movie theaters.
DENC Digital video ENCoder
DE-STB DOCSIS Enabled-Set Top Box (STB), e.g., using DSG for one-way OOB traffic and DOCSIS for interactivity
DDNS Dynamic Domain Name System
DDWG Digital Display Working Group (Author of DVI specification)
DOCSIS Data Over Cable Service Interface Specifications
DOCSIS-CP DOCSIS Control Plane
DNS Domain Name System
DSG DOCSIS Set Top Gateway
DTD DSG Tunnel Descriptor
DVD (1) Digital Versatile Disc, (2) Digital Video Disc
DVI Digital Video Interface (multimedia standard for computer generated text and graphics)
DVS Digital Video Subcommittee
eCM Embedded Cable Modem Entity
EDID Extended Display Identification Data
eSTB Embedded Set Top Box Entity
EAS Emergency Alert System
EPG Electronic Program Guide. An on-screen display of channels and program data.
FAT File Access Table FCC Federal Communications Commission. The U.S. government branch that generally regulates and enforces broadcasting in the U.S.
GOP Group of Pictures (MPEG)
HDCP High-Bandwidth Digital Content Protection (Intel)
HDD Hard disk drive
HDMI High Definition Multimedia Interface
HDTV High Definition Television. HDTV is digitally encoded video at roughly 6× the spatial resolution of standard definition television. HDTV generally provides startlingly clearer, crisper images plus wide screen viewing than analog TV and standard definition television.
HFC Hybrid Fiber Coax
HHP Households Passed
HITS (1) Headend In The Sky; (2) Hughes Information Technology Systems
HPNA Home Phoneline Networking Alliance
HSD High Speed Data
HW Hardware
IEC International Electrotechnical Commission
IP Internet Protocol
IPSec Secure Internet Protocol
IPPV Impulse (or Interactive) Pay Per View
IRD Integrated Receiver Decoder
IRD Integrated Receiver Descrambler
IRE International Radio Engineers
IRT Integrated Receiver/Transcoder
ITU-T International Telecommunication Union-Telecommunication
LLC Logical Link Control
LO Local Oscillator
MAC Media Access Control
MPEG Motion Picture(s) Expert Group
MIB Management Information Base
MIPS Million Instructions Per Second
MSO Multiple System Operator
MTA Multimedia Terminal Adaptor
MTU Maximum Transmission Unit
NG Next Generation
NGSTB Next Generation Set Top Box
NTSC National Television System Committee. NTSC was responsible for developing Standards for "traditional" U.S. analog TV, prior to Digital-HDTV.
NVRAM Non Volatile Random Access Memory
OAM&P Operations, Administration, Maintenance and Provisioning
OCAP OpenCable™ Application Platform (middleware software specification)
OOB Out-Of-Band
OS Operating System
PAL Phase Alternation Line. PAL is a signal format used in video equipment in Europe and parts of Asia. PAL signals provide for 25 frames per second, and, thus, are incompatible with NTSC, the American video signal format.
PCMCIA Personal Computer Memory Card International Association
PES Packetized Elementary Stream (MPEG-2)
PID Planned Imaging Data
PHY Physical layer device
POD Point Of Deployment
PPV Pay Per View
QAM Quadrature Amplitude Modulation
QoS Quality of Service
QPSK Quadrature Phase-Shift Keying
SAP Secondary Audio Program
SATA Serial Advanced Technology Attachment (hard disk interface)
SCTE Society of Cable Telecommunications Engineers
SECAM Systeme Electronique Couleur Avec Mémoire. A signal format used in video equipment in France and the former Soviet Union. SECAM is incompatible with PAL and NTSC formats.
SI System Information
SID Service ID
SNMP Simple Network Management Protocol
SPDIF Sony-Phillips Digital Interface Format
STB Set Top Box (also Decoder, Receiver, Tuner, Transceiver). A unit similar to cable boxes. The STB capable of receiving and decoding DTV broadcasts. A DTV 'Certified' STB can receive all (18) ATSC DTV formats, (including HDTV) and provide a displayable picture.
STB-CP Set Top Box Control Plane
SDTV Standard Definition Television. Digital transmissions having 480-line resolution in either interlaced or progressive scanned formats. SDTV generally provides significant improvement over conventional NTSC picture resolution, similar to comparing DVD quality to VHS, primarily because the digital transmission eliminates snow and ghosts, common with the current NTSC analog format. However, SDTV does not generally provide HDTV level visual and audio quality.
S-Video Separated video. An encoded video signal format which separates brightness data from color data. S-video generally improves the picture when connecting TVs to any high quality video source such as digital broadcast satellite ("dish") (DBS) and DVDs.
TCP Transmission Control Protocol
TS Tuner Stream
TV Television
UDP User Datagram
UHF Ultra high frequency, the range used by TV channels 14 through 69.
UI User Interface
VBI Vertical Blanking Interval
VHF Very High Frequency. The frequency range used by TV channels 2 through 13.
VHS Video Home System (video cassette format; patented by JVC)
VOD Video On Demand
VoIP Voice over IP
XMOD Cross Modulation
Y, PB, PR The most advanced method for interconnecting decoded video data. Generally used where a digital TV signal source is used. Preferred connection for HDTV signals. Y, PB, PR generally enables superior quality in transmitted picture. The video signal is separated into its component parts of brightness and color differentials.
Y, U, V Also referred to as Y, Cr, Cb. A format wherein a video signal is separated into components of brightness and color, arguably to a greater degree than provided by S-video.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
receiving, by a computing device, from a video viewing device, and based on a request for a response indicating a type of video viewing device, a signal indicating the type of the video viewing device;

selecting, based at least in part on the signal, a second video format from a plurality of video formats comprising a first video format and the second video format, wherein the second video format corresponds to higher display capability parameters than the first video format; and causing transmission, to the video viewing device and after the selecting the second video format, of video content formatted in accordance with the second video format.

2. The method of claim 1, wherein the second video format comprises a high-definition television (HDTV) signal format.

3. The method of claim 1, wherein the causing transmission of the video content to the video viewing device comprises causing transmission of the video content to a device associated with the video viewing device.

4. The method of claim 1, wherein the signal comprises an indicator of a manufacturer of the video viewing device.

5. The method of claim 1, wherein the video viewing device comprises an HDTV television.

6. The method of claim 1, wherein the request for the response comprises an instruction to interrogate the video viewing device, and the method further comprising sending the instruction to interrogate the video viewing device to a device associated with the video viewing device.

7. The method of claim 6, wherein the receiving the signal is performed after the sending the instruction to interrogate the video viewing device.

8. The method of claim 1, wherein the signal indicates at least one video resolution corresponding to the video viewing device.

9. The method of claim 1, wherein the selecting the second video format is based at least in part on a determination that the video viewing device comprises a high-definition video viewing device.

10. A non-transitory computer-readable medium having stored thereon a plurality of instructions that, when executed by one or more processors, cause:

receiving, based on a request for a response indicating a type of a video viewing device, a signal indicating the type of the video viewing device;

selecting, based at least in part on the signal, a second video format from a plurality of video formats comprising a first video format and the second video format, wherein the second video format corresponds to higher display capability parameters than the first video format; and causing transmission, to the video viewing device and after the selecting the second video format, of video content formatted in accordance with the second video format.

11. The non-transitory computer-readable medium of claim 10, wherein instructions, when executed by the one or more processors, cause the receiving by causing receiving, from the video viewing device, the signal.

12. The non-transitory computer-readable medium of claim 10, wherein the second video format comprises a high-definition television (HDTV) signal format.

13. The non-transitory computer-readable medium of claim 10, wherein the instructions, when executed by the one or more processors, further cause determining, based at least in part on the signal, that the video viewing device is compatible with the second video format.

14. The non-transitory computer-readable medium of claim 10, wherein the instructions, when executed by the one or more processors, further cause sending the request for the response to a device associated with the video viewing device.

15. The non-transitory computer-readable medium of claim 10, wherein the instructions, when executed by the one or more processors, cause the causing transmission by causing transmission of the video content to a device associated with the video viewing device.

16. The non-transitory computer-readable medium of claim 10, wherein the instructions, when executed by the one or more processors, further cause sending the request for the response to the video viewing device periodically over a period of time.

17. An apparatus comprising:
one or more processors; and
memory storing instructions that, when executed by the one or more processors, cause the apparatus to:
receive, based on a request for a response indicating a type of a video viewing device, a signal indicating the type of the video viewing device;
select, based at least in part on the signal, a second video format from a plurality of video formats comprising a first video format and the second video format, wherein the second video format corresponds to higher display capability parameters than the first video format; and
cause transmission, to the video viewing device and after selection of the second video format, of video content formatted in accordance with the second video format.

18. The apparatus of claim 17, wherein the instructions, when executed by the one or more processors, further cause the apparatus to store, based at least in part on the signal, an indication that the video viewing device comprises a high-definition video viewing device.

19. The apparatus of claim 17, wherein the instructions, when executed by the one or more processors, further cause the apparatus to determine, based at least in part on the signal, that the video viewing device is compatible with the second video format.

20. The apparatus of claim 17, wherein the instructions, when executed by the one or more processors, further cause the apparatus to send the request for the response to a device associated with the video viewing device.

21. A system comprising:
a first computing device; and
a second computing device;
wherein the first computing device comprises:
one or more processors; and
memory storing first instructions that, when executed by the one or more processors of the first computing device, cause the first computing device to: receive, based on a request for a response indicating a type of a video viewing device, a signal indicating the type of the video viewing device;
select, based at least in part on the signal, a second video format from a plurality of video formats comprising a first video format and the second video format, wherein the second video format corresponds to higher display capability parameters than the first video format; and
cause transmission, to the second computing device, of video content formatted in accordance with the second video format; and wherein the second computing device is associated with the video viewing device and comprises:
  one or more processors; and
  memory storing second instructions that, when executed by the one or more processors of the second computing device, cause the second computing device to receive the video content.

22. The system of claim 21, wherein the second instructions, when executed by the one or more processors of the second computing device, further cause the second computing device to interrogate the video viewing device.

23. The system of claim 21, wherein the signal comprises an indicator of a video resolution corresponding to the video viewing device.

24. The system of claim 21, wherein the first instructions, when executed by the one or more processors of the first computing device, further cause the first computing device to determine, based at least in part on the signal, that the video viewing device is compatible with the second video format.

* * * * *